(12) United States Patent
Fletcher et al.

(10) Patent No.: US 9,022,747 B2
(45) Date of Patent: May 5, 2015

(54) GAS COMPRESSION

(75) Inventors: Paul Fletcher, Rugby (GB); Philip P. Walsh, West Midlands (GB)

(73) Assignee: Rolls-Royce PLC, London (GB)

( * ) Notice: Subject to any disclaimer, the term of this patent is extended or adjusted under 35 U.S.C. 154(b) by 301 days.

(21) Appl. No.: 13/505,861

(22) PCT Filed: Nov. 12, 2010

(86) PCT No.: PCT/EP2010/067365
§ 371 (c)(1),
(2), (4) Date: May 30, 2012

(87) PCT Pub. No.: WO2011/058129
PCT Pub. Date: May 19, 2011

(65) Prior Publication Data
US 2012/0230840 A1    Sep. 13, 2012

(30) Foreign Application Priority Data
Nov. 12, 2009    (GB) .................................. 0919771.6

(51) Int. Cl.
*F04B 23/04*    (2006.01)
*F04B 49/06*    (2006.01)
(Continued)

(52) U.S. Cl.
CPC .............. *F04D 27/001* (2013.01); *F04B 41/06* (2013.01); *F04B 49/065* (2013.01); *F04B 23/04* (2013.01);
(Continued)

(58) Field of Classification Search
CPC ...... F04B 49/065; F04B 25/00; F04B 49/007; F04B 49/20; F04B 41/06; F04B 2205/01; F04B 23/04; F04B 49/022; F04D 27/0261; F04D 27/0269; F04D 27/001; F04C 23/003

USPC ............. 417/2, 16, 17, 18, 20, 244, 246, 247, 417/253, 43
See application file for complete search history.

(56) References Cited

U.S. PATENT DOCUMENTS 1,635,318 A * 7/1927 Frey .................................. 417/2
3,238,738 A * 3/1966 Webber ........................ 62/196.2
(Continued)

FOREIGN PATENT DOCUMENTS

EP    0 626 519 A1    11/1994
GB    2 024 328 A    1/1980
(Continued)

OTHER PUBLICATIONS

Mar. 31, 2011 International Search Report issued in PCT/EP2010/067365.
(Continued)

*Primary Examiner* — Alexander Comley
(74) *Attorney, Agent, or Firm* — Oliff PLC

(57) ABSTRACT

A method of compressing a gas, which uses a compressor train having a plurality of discrete portions and including at least an upstream portion, a mid-stream portion and a downstream portion arranged successively in flow series. The method includes: (i) performing a first compression step by directing a flow of said gas into the upstream compressor portion and driving the upstream compressor portion to compress the gas; (ii) performing a second compression step by directing the compressed flow from the upstream compressor portion into the mid-stream compressor portion and driving the mid-stream compressor portion to further compress the gas; and (iii) performing a third compression step by directing the compressed flow from the mid-stream compressor portion into the downstream compressor portion and driving the downstream compressor portion to further compress the gas.

16 Claims, 5 Drawing Sheets

(51) Int. Cl.
*F04B 49/20* (2006.01)
*F04D 27/00* (2006.01)
*F04B 41/06* (2006.01)
*F04D 17/14* (2006.01)
*F04D 27/02* (2006.01)

(52) U.S. Cl.
CPC ............ *F04D 17/14* (2013.01); *F04D 27/0215* (2013.01); *F04D 27/0246* (2013.01); *F04D 27/0261* (2013.01); *F04D 27/0269* (2013.01)

(56) References Cited

U.S. PATENT DOCUMENTS

| | | | | |
|---|---|---|---|---|
| 3,480,199 | A * | 11/1969 | Friedrich | 417/272 |
| 4,655,049 | A * | 4/1987 | Andrews et al. | 62/172 |
| 5,586,861 | A * | 12/1996 | Berger | 415/118 |
| 5,743,715 | A * | 4/1998 | Staroselsky et al. | 417/6 |
| 6,164,901 | A * | 12/2000 | Blotenberg | 415/1 |
| 6,305,910 | B1 * | 10/2001 | Miura et al. | 417/244 |
| 6,564,627 | B1 * | 5/2003 | Sabini et al. | 73/168 |
| 6,755,620 | B2 * | 6/2004 | Nakamura et al. | 417/2 |
| 6,802,696 | B1 * | 10/2004 | Verhaegen | 417/2 |
| 2003/0161731 | A1 * | 8/2003 | Blotenberg | 417/2 |
| 2003/0175128 | A1 * | 9/2003 | Fabry | 417/243 |
| 2003/0206809 | A1 * | 11/2003 | Walker | 417/53 |
| 2007/0065300 | A1 * | 3/2007 | Mariani et al. | 417/243 |
| 2007/0189905 | A1 * | 8/2007 | Dinsdale et al. | 417/2 |
| 2008/0008602 | A1 * | 1/2008 | Pozivil et al. | 417/243 |
| 2008/0131258 | A1 | 6/2008 | Liepold et al. | |
| 2008/0170948 | A1 * | 7/2008 | Martinez et al. | 417/53 |
| 2008/0273989 | A1 * | 11/2008 | Inoue | 417/2 |
| 2008/0302107 | A1 * | 12/2008 | Fan et al. | 60/783 |
| 2009/0081061 | A1 * | 3/2009 | Chomyszak et al. | 418/35 |
| 2009/0169452 | A1 * | 7/2009 | Constantz et al. | 423/230 |
| 2009/0205362 | A1 | 8/2009 | Haley | |
| 2009/0304522 | A1 * | 12/2009 | Lelong et al. | 417/5 |

FOREIGN PATENT DOCUMENTS

| | | | |
|---|---|---|---|
| GB | 2 372 539 A | 8/2002 | |
| GB | 2372539 A * | 8/2002 | ............. F04D 27/00 |
| WO | WO 03/049122 A2 | 6/2003 | |
| WO | WO 2007/035700 A2 | 3/2007 | |
| WO | WO 2007035700 A2 * | 3/2007 | ............. F04D 25/06 |
| WO | WO 2007/095537 A1 | 8/2007 | |
| WO | WO 2007095537 A1 * | 8/2007 | |

OTHER PUBLICATIONS

Mar. 31, 2011 Written Opinion issued in PCT/EP2010/067365.

* cited by examiner

* Variable inlet guide vane    ** Variable area diffuser vane

GAS COMPRESSION

The present invention relates to gas compression. More particularly, the invention relates to a method for the compression of gas and most preferably carbon dioxide, for example as part of a carbon capture and storage scheme.

Carbon dioxide Capture and Storage (CCS) has been proposed as an approach for reducing greenhouse gas emissions from the use of fossil fuels.

CCS involves capturing the carbon dioxide produced at sites such as fossil-fuel power generation plants, compressing it into a dense liquid state (typically at a pressure ratio of up to 200) and then transporting it via a pipeline system to storage facilities at which the carbon dioxide is stored in such a way that its release into the atmosphere is prevented. For example, storage facilities may sequestrate the carbon dioxide by injection, in its compressed liquid form, into oil- and gas-field formations, coal seams or saline water-bearing formations. Alternatively, the carbon dioxide may be sequestrated by reaction with magnesium- and calcium-containing minerals to form stable carbonates.

Power generation plants are normally operated so as to produce electrical power at a rate which is directly related to the power-demand at any particular point in time. As the demand for electrical power varies over time, the amount of power produced by the power plant must also vary, and this variation causes a corresponding variation in the amount of waste carbon dioxide which is produced by the plant. This complicates the process of compressing the carbon dioxide for sequestration, as it is difficult to operate compressors effectively in response to a constantly changing supply of carbon dioxide.

Using currently available technology, maintaining the drive power of a CCS compressor to acceptable levels requires the overall compression to be divided into a number of discrete steps, or so-called "sections", with intercooling provided between successive sections.

For a modern coal-fired power station, it has been found that the power required to drive the compressor can typically represent as much as 8% of the total power output of the station, even with a compressor having 8 intercooled steps. This represents a significant parasitic load on the power station.

Previously proposed compressor arrangements of the type mentioned above are typically configured such that each discrete section comprises one or more compressor stages, which are mostly of centrifugal configuration. The overall compressor system is often referred to as a compressor "train".

The large target increase in carbon dioxide pressure through the compressor train requires the rear (downstream) sections to be significantly smaller than the front (upstream) sections. The optimum rotational speed of the rear compressor sections is thus higher than the optimum speed of the front sections. This speed differential can be achieved in various ways, the most common of which uses an "integrally geared" layout in which single centrifugal stages are mounted around a gearbox and driven at different, but fixed, speeds to one another. This type of layout requires only a single input drive and so minimizes cost.

The pipeline network downstream of the compressor system operates at a pressure level which is generally independent of the power and carbon dioxide output of an individual power station. Although the pipeline pressure may, in reality, vary slightly over time (for example as storage facilities fill up over time, or as a function of the carbon dioxide output from other power stations on the same network), it can be considered to remain essentially constant relative to the more significantly varying carbon dioxide output of an individual power station, even when the power plant is only operating at very low power.

A single conventional compressor train is typically able to maintain a constant pressure ratio only down to approximately 75% of its maximum flow rate. In contrast, a power station might sometimes be required to operate at power levels as low as 25% of its maximum power. Under such operating conditions, the power station typically produces only 33% of the flow of carbon dioxide which is produced when the power station is operating at full power.

Previously proposed carbon dioxide compressor systems for use in CCS are designed in such a way as to be optimised for full power operating conditions. Accordingly, they are not well suited to operation with reduced flows of carbon dioxide arising from low power running of a power station. In order to address this, it has been proposed to operate such compressor trains under low power conditions by recirculating carbon dioxide from the outlet of the compressor train back to the inlet of the compressor train. However, when operated in accordance with this type of regime, even at 25% of maximum plant power, the power required to drive the compressor train is still typically as high as 80% of its full power level. At such low plant power, the parasitic load of the compressor on the power station becomes very significant indeed, thereby significantly reducing the overall efficiency of the power generation scheme.

It is an object of the present invention to provide an improved method of compressing gas, such as carbon dioxide.

According to the present invention, there is provided a method of compressing a gas within a gas capture and storage process, said method using a compressor train having a plurality of discrete portions and comprising at least an upstream portion, a mid-stream portion and a downstream portion arranged successively in flow series, the method comprising: (i) performing a first compression step by directing a flow of said gas into the upstream compressor portion and driving the upstream compressor portion to compress the gas; (ii) performing a second compression step by directing the compressed flow from the upstream compressor portion into the mid-stream compressor portion and driving the mid-stream compressor portion to further compress the gas; and (iii) performing a third compression step by directing the compressed flow from the mid-stream compressor portion into the downstream compressor portion and driving the downstream compressor portion to further compress the gas; wherein the method involves controlling the operation of one or more discrete compressor portions independently of the others.

In one embodiment, the downstream compressor portion is driven or otherwise controlled independently of the upstream and mid-stream compressor portions.

Preferably, said third compression step is controlled in dependence on the flow rate of gas directed into the upstream compressor portion.

Conveniently, the flow rate of gas directed into the upstream compressor portion may be determined from the pressure of the gas as measured in the region of the inlet of the upstream compressor portion.

For the purpose of controlling the compression portions independently of one another, the use of flow rate or pressure may be considered interchangeable.

Advantageously, said third compression step is performed selectively in dependence on the flow rate of gas directed into the upstream compressor portion.

Conveniently, said third compression step is performed only when the flow rate of gas directed into the upstream compressor portion is below a predetermined threshold value.

Optionally, the third compression step may be eliminated when the flow rate of gas directed into the upstream compressor portion exceeds said predetermined threshold value, this being achieved by directing the compressed flow from the mid-stream compressor portion so as to bypass the downstream compressor portion.

Preferably, said threshold value is approximately 25% of the maximum flow rate.

The downstream compressor portion may comprise at least one variable-geometry compressor, in which case the third compression step can be controlled by adjusting the geometry of the or each said compressor.

Additionally, or alternatively, downstream compressor portion may comprise a plurality of selectively operable compressors arranged in parallel flow-relation to one another. The third compression step may thus be controlled via selection of the number of said compressors for operation and through which compressed gas from the mid-stream compressor portion is directed.

The third compression step is preferably controlled by increasing the number of said compressors in operation in response to a decrease in the rate of flow of gas directed into the upstream compressor portion.

Preferably the speed at which at least the upstream compressor portion is driven is varied in dependence on the flow rate of gas directed into it.

Conveniently, the speed of the upstream compressor is reduced in response to a reduction in the flow rate of gas directed into it, the upstream compressor thus producing a reduced outlet flow for direction into the mid-stream compressor portion.

In one embodiment, the upstream compressor section may be bypassed or mechanically disconnected upon determination of a flow rate below a predetermined threshold value. This may be enacted for relatively low flow rates in preference to operating the upstream compressor at low speed. The threshold value may be, for example, approximately 10%, 20%, 30% or 40%, or any value there-between, of a maximum flow rate value.

The speed at which the mid-stream compressor portion is driven may also be varied in dependence on the flow rate of compressed gas directed into it.

Preferably, the speed of the mid-stream compressor is reduced in response to a reduction in the flow rate of gas directed into it, the mid-stream compressor thus producing a reduced outlet flow.

The above-mentioned method is most preferably performed on carbon dioxide, and may thus form part of a carbon dioxide sequestration scheme.

In such a method, the carbon dioxide which is directed into the compressor train may obtained directly from a carbon dioxide producing site such as a power generation plant configured to operate at variable power.

The flow rate of carbon dioxide directed into the upstream compressor portion may vary in dependence on the output power of the power generation plant. Accordingly, the flow rate of carbon dioxide directed into the compressor train will be reduced when the output power of the power plant is reduced.

According to a second aspect of the present invention, there is provided a gas compression system for a gas sequestration process, comprising: a compressor train having a plurality of discrete portions and comprising at least an upstream portion, a mid-stream portion and a downstream portion arranged successively in flow series such that gas exiting the upstream portion is further compressible by the mid-stream portion and gas exiting the mid-stream portion is further compressible by said downstream portion; a drive for transmitting a compression force to said compressor train; and, a controller arranged to control the driving of one or more discrete compressor portions independently of said other portions based on the flow rate of gas directed into the upstream compressor portion.

Any of the optional features described in relation to the first aspect may be applied to the second aspect wherever practicable.

So that the invention may be more readily understood, and so that further features thereof may be appreciated, embodiments of the invention will now be described by way of example with reference to the accompanying drawings in which.

Figure 1:
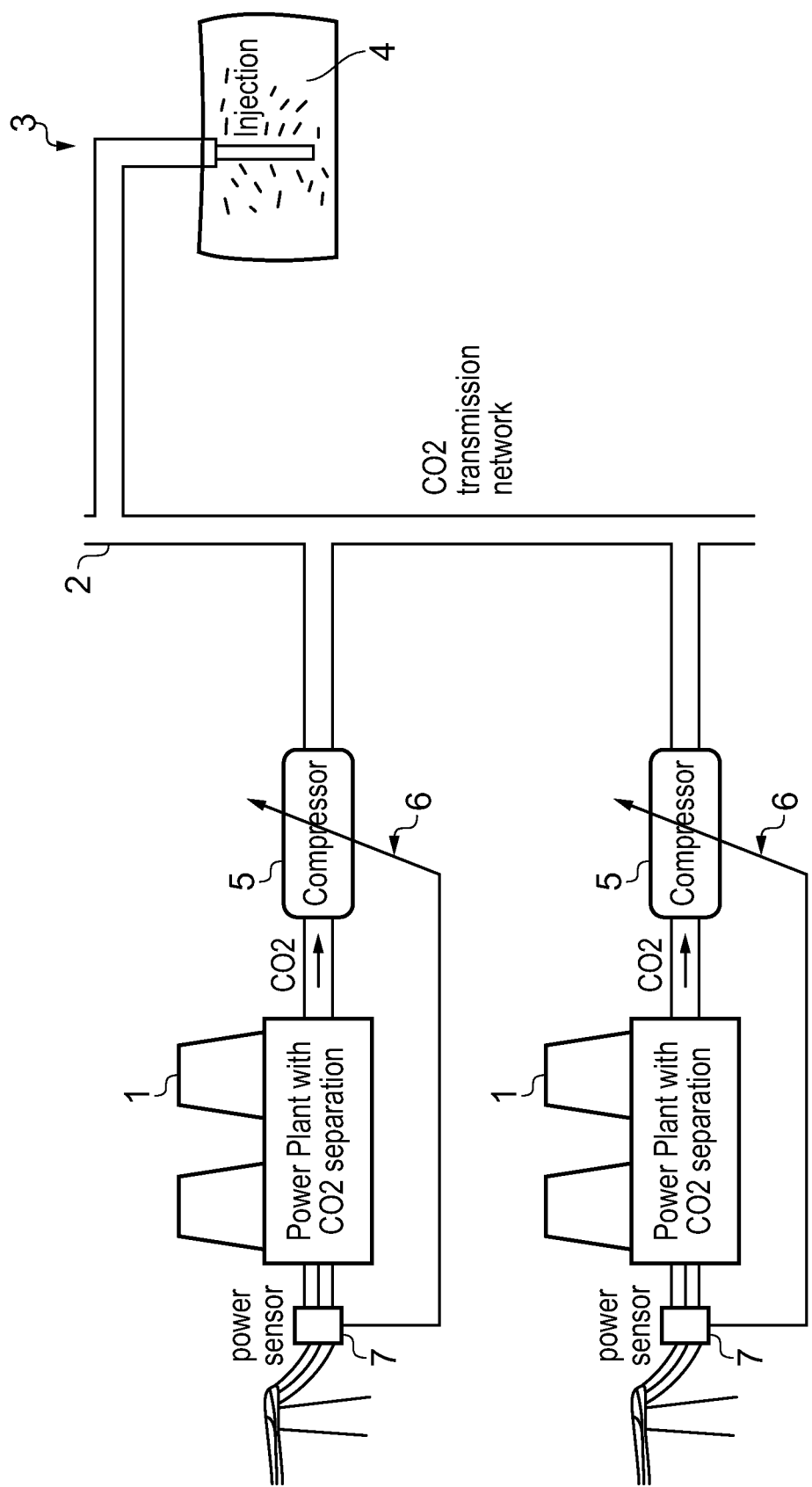
FIG. 1 is a schematic diagram showing a carbon dioxide sequestration system.

Turning now to consider the drawings in more detail, FIG. 1 shows the general arrangement of a carbon dioxide sequestration system. The system is shown to include two separate fossil fuel power plants 1 which of course produce carbon dioxide, but which are specifically configured to capture their carbon dioxide. It should be appreciated, however, that the system could include only a single power plant 1, or indeed three or even more power plants. The captured carbon dioxide produced by the power plants 1 is directed into a pipeline network 2 which serves to transport the carbon dioxide to a remote storage facility 3. At the storage facility, the carbon dioxide is injected into a geological formation 4, which is an example of a carbon dioxide storage medium.

Each power plant has a compressor arrangement 5 which pressurizes the captured carbon dioxide gas before it is directed into the pipeline network. As already indicated, the compressor arrangements 5 are each configured to compress the carbon dioxide by a pressure ratio (PR) of up to 200, and assuming they are fed with carbon dioxide gas arising from their respective power plants 1 at a pressure of 1 bar, are thus effective to increase the pressure of the carbon dioxide to approximately 200 bar, thereby rendering it a highly compressed liquid.

Each compressor arrangement 5 has a control system 6 which is configured to vary the power of the compressor in response to variations in the output power of the respective plant, as measured by a measuring system 7. Each control system 6 thus acts upon a signal received by the respective measuring system 7 so that as the power generated by the respective plant varies, the power of the compressor also varies. Because the carbon dioxide production rate of the plant is related to the power generated, this has the effect of matching the operating point of the compressor arrangement to the respective plant's carbon dioxide output, thereby allowing the compressor arrangement to continue to operate effectively despite variations in the flow of carbon dioxide directed into it from the power plant. For example, in the case of a 2 GW power plant operating at its maximum power output, the compressor arrangement 5 can be set to compress the maximum amount of carbon dioxide produced by the plant. However, when the power plant reduces its capacity down to 100 MW, for example when power demand falls, the compressor power will also decrease. If the power of the compressor arrangement were not capable of being varied when the power plant output changes in this way, the compressor would at times be improperly matched to the carbon dioxide production rate. This could lead to compressor failure or stoppage, and/or accidental release of carbon dioxide.

Figure 2:
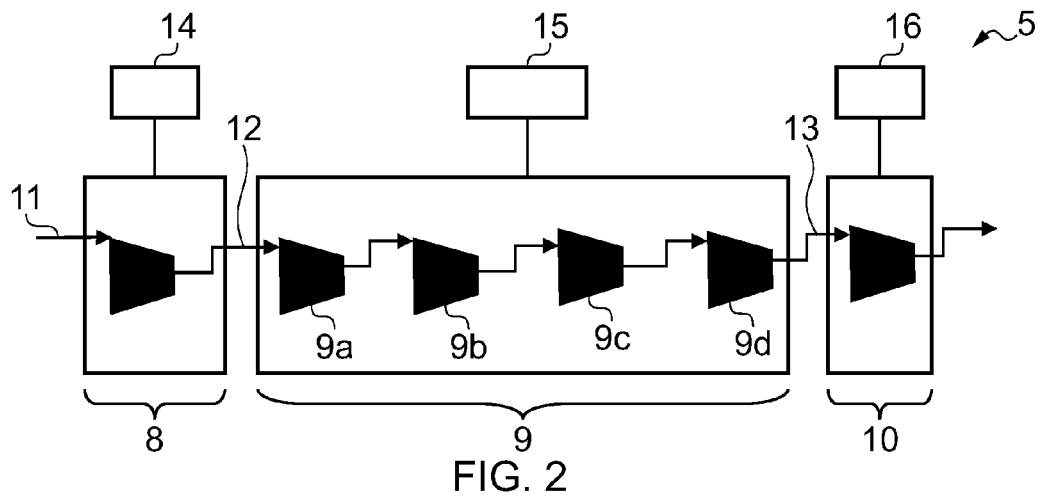
FIG. 2 is a schematic diagram showing a compressor train for use with the method of the present invention, comprising three discrete compressor portions.

FIG. 2 shows the configuration of a preferred compressor arrangement 5 in accordance with the present invention in more detail. The compressor arrangement 5 is provided in the form of a so-called compressor train, and comprises at least three discrete compressor portions, namely; an upstream portion 8, a mid-stream portion 9, and a downstream portion 10. The portions 8, 9, 10 are arranged successively in flow series. Accordingly, the flow of carbon dioxide gas 11 produced by the power plant 1 and which is to be compressed, is directed into the upstream compressor portion 9 within which an initial stage of compression occurs. The resulting compressed flow 12 then exits the upstream compressor portion 8 and is directed into the mid-stream compressor portion 9 where further compression takes place. The compressed flow 13 exiting the mid-stream compressor portion 9 may then be directed into the final downstream compressor portion 10 for further compression, as will be explained in more detail hereinafter.

Each of the discrete compressor portions 8, 9, 10 may comprise either a single compressor stage or may comprise a plurality of compressor stages connected in series. For example, the particular arrangement illustrated in FIG. 2 incorporates an upstream portion 8 and a downstream portion 10, both of which are provided in the form of a single stage. However, the mid-stream compressor portion 9 is shown to comprise four discrete compressor stages 9a, 9b, 9c, 9d which are connected in series relative to the flow of compressed gas directed through them. As will be appreciated by those of skill in the art of compressor design, such a multi-stage compressor arrangement may incorporate an intercooler (not shown) between each successive pair of stages.

A significant feature of the compressor train arrangement used in the present invention is that the three discrete compressor portions are driven independently of one another, in the sense that each may be driven at a different speed relative to the other two portions. This also permits the operational speed of each compressor portion to be varied independently during operation of the compressor train, as will be explained in more detail hereinafter. In the particular arrangement of FIG. 2, each compressor portion 8, 9, 10 is shown in connection with a respective electric motor 14, 15, 16, the motors being arranged to drive each compressor at a variable speed, and to draw their electrical power from the power plant 1.

Figure 3:
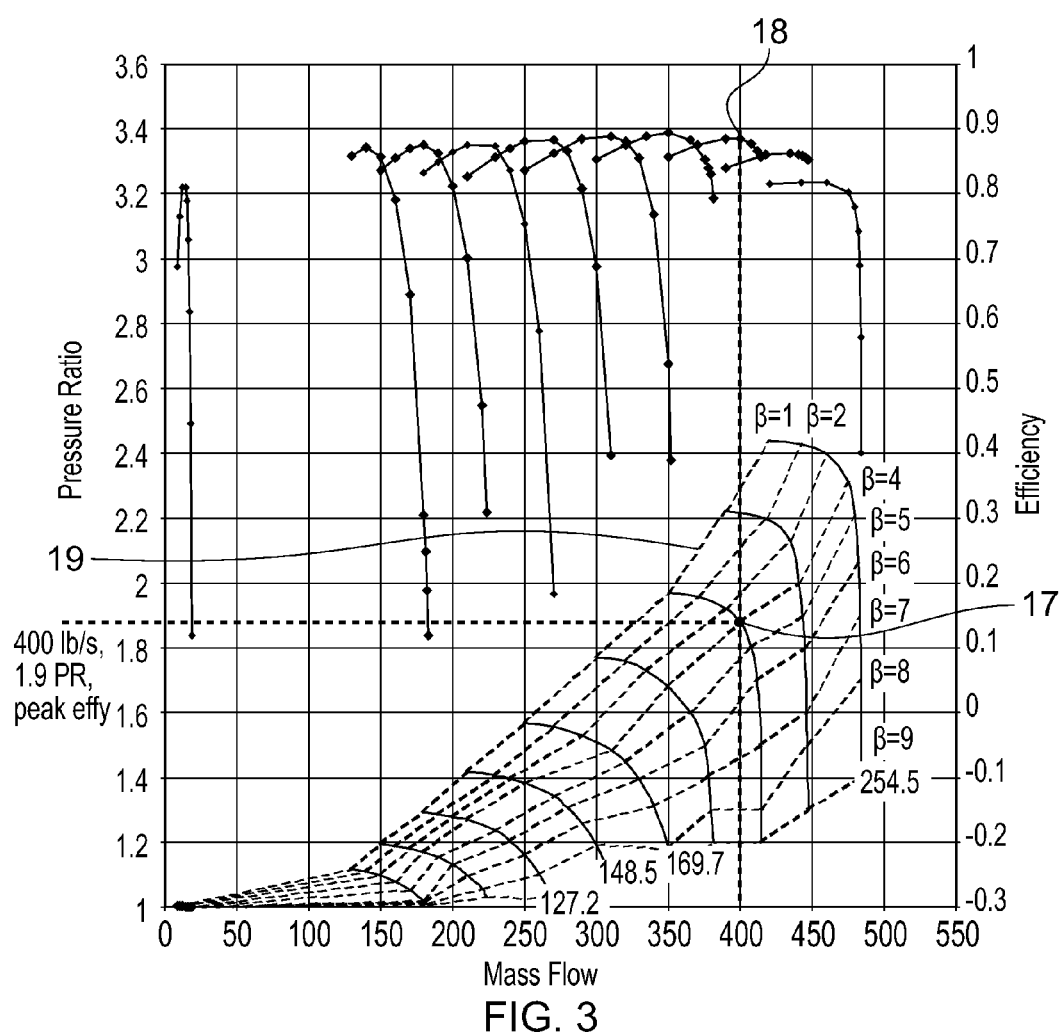
FIG. 3 is an exemplary compressor map representing the performance characteristics of the first, upstream, compressor portion of the compressor train shown in FIG. 2, showing a first proposed operating point.

FIG. 3 illustrates an exemplary compressor map representative of the performance characteristics of the upstream compressor portion 8. The map comprises plots of pressure ratio (PR) and isentropic efficiency against the mass flow rate through the compressor portion, as is conventional. The particular numerical values appearing on the map are not intended to be restrictive, and are provided simply by way of example. Reference point 17 shown on the compressor map represents a proposed maximum-flow operating point for the upstream compressor portion 8, and thus represents a suitable operating speed for the compressor portion 8 when the maximum possible flow rate of carbon dioxide 11 directed into it. The maximum-flow operating point 17 thus corresponds to the maximum (i.e 100%) power output condition of the power plant 1. As will be appreciated, the maximum-flow operating point 17 is carefully selected so as to correspond substantially to a peak efficiency point 18, and to provide a suitable surge margin, falling below the surge line 19. The exemplary maximum-flow operating point 17 shown in FIG. 3 corresponds to a pressure ratio (PR) across the upstream portion of 1.9, and a mass-flow rate of 400 lb/s.

Figure 5:
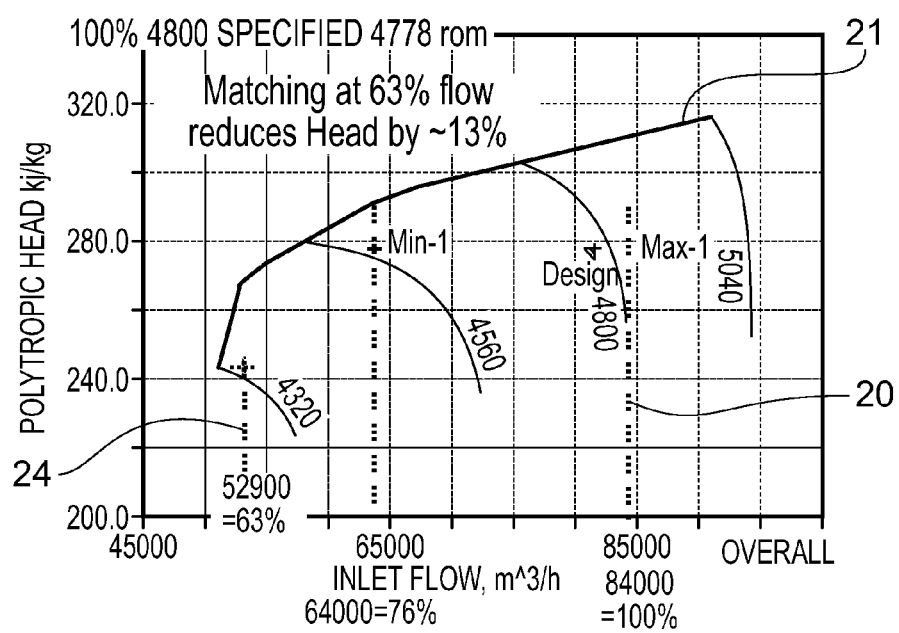
FIG. 5 is an exemplary compressor map representing the performance characteristics of the second, mid-stream, compressor portion of the compressor train shown in FIG. 2, showing alternate operating points.

As indicated above, the compressed flow 12 exiting the upstream compressor portion 8 is fed directly into the mid-stream compressor portion 9. Turning therefore briefly to consider FIG. 5, the resulting flow 12 arising from the maximum power condition and which is directed into the mid-stream compressor portion 9 is indicated schematically by line 20 on the illustrated compressor map for the mid-stream portion 9. The compressor map of FIG. 5 is representative of a plot of polytropic head against the volume-flow rate of the flow 12 entering the mid-stream portion 9. The mid-stream portion 9 is thus operated at a speed appropriate to give a suitable surge margin having regard to the surge line 21. The operational speed of the mid-stream compressor portion 9 will be different to that of the upstream portion 8.

Figure 4:
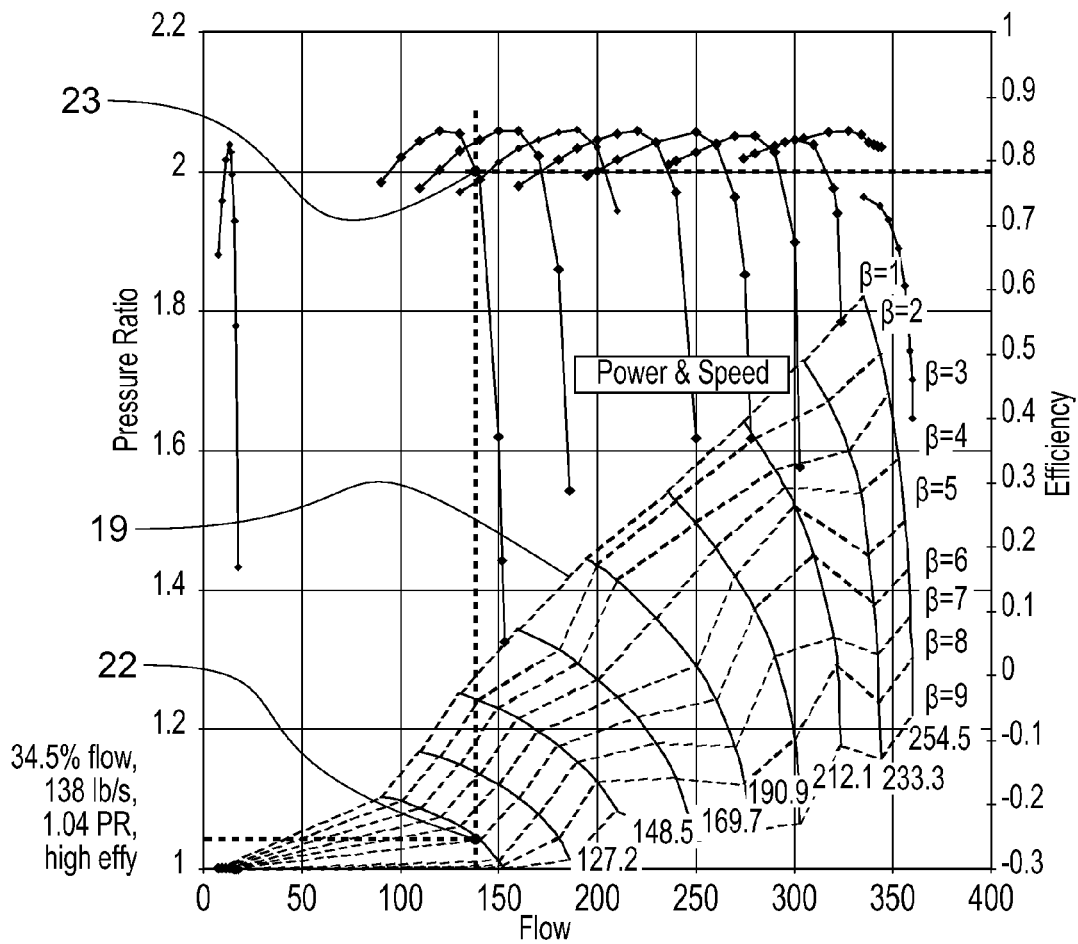
FIG. 4 is a further exemplary compressor map for the first compressor portion, showing a second proposed operating point.

Turning now to consider FIG. 4, operation of the compressor train at low output power of the power plant 1 will be considered. FIG. 4 corresponds generally to FIG. 3, but shows the region of the upstream portion's compressor map corresponding to lower mass-flow conditions.

As indicated above, a reduction in the output power of the power plant 1 will have the effect of reducing the flow rate of carbon dioxide gas produced by the plant and thus directed into the compressor train as input flow 11. Accordingly, FIG. 4 shows a reduced-flow operating point which corresponds to a reduced power output condition (for example 25% maximum power) of the power plant 1. As will be appreciated, the reduced-flow operating point 22 is again carefully selected to correspond to a high efficiency level 23, and to provide a suitable surge margin, falling below the surge line 19. For the reduced flow condition, this necessitates a reduced operating speed of the upstream compressor portion 8. The upstream compressor portion 8 is thus operated such that its speed is allowed to reduce in response to a reduction of the flow rate of gas 11 directed into it (which corresponds to a reduction in the output power of the plant 1). The exemplary reduced-flow operating point 22 shown in FIG. 4 corresponds to a pressure ratio (PR) across the upstream portion of 1.04, and a mass-flow rate of 138 lb/s. As will be appreciated, in this example, the reduction in output power of the plant 1 from 100% to 25% has had the effect of reducing the mass flow rate of gas from 400 lb/s to 138 lb/s. In other words, the mass flow rate of gas directed into the upstream portion has been reduced down to 34.5% of its maximum.

The volume flow ratio between the reduced flow condition and the maximum flow condition of the upstream compressor portion 8 can be calculated as follows:

Vol. flow ratio=$(M_{red}/PR_{red})/(M_{max}/PR_{max})$

Where:
$M_{red}$ represents the reduced mass flow rate
$PR_{red}$ represents the reduced pressure ratio
$M_{max}$ represents the maximum mass flow rate corresponding to 100% plant power, and
$PR_{max}$ represents the maximum pressure ratio So, for the values applicable to the particular example illustrated on the compressor maps of FIGS. 3 and 4:

Vol. flow ratio=(138/1.04)/(400/1.9)=0.63

This means that at the proposed reduced flow operating point 22, the upstream compressor portion 8 is producing 63% of the volume flow rate of compressed gas which it was at the proposed maximum operating point 17. As will thus be appreciated, during the reduced flow conditions, only 63% of the maximum flow of compressed gas 12 is directed into the mid-stream compressor portion 9.

So, for the numerical example used above, it will be seen that whilst the mass flow rate through the upstream compressor portion 8 has dropped to 34.5% of its maximum value, by reducing the operating speed of the compressor portion, and hence also its pressure ratio, the volume flow rate through the upstream compressor portion 8 has only dropped to 63% of its maximum value. This means that the output 12 from the upstream compressor portion 8 is less dense at the reduced flow condition than at the maximum flow condition. As will thus be appreciated, by operating the upstream compressor portion 8 on a schedule of reducing speed in response to a reduction in plant power (and thus corresponding to a reduction in input flow rate; for example as determined from the pressure of gas measured at the inlet of the upstream compressor portion 8), the variation in volume flow directed into the midstream portion 9 is reduced.

Turning now to consider again FIG. 5, the reduced flow 12 (63% in volume terms) arising from the reduced power operation of the upstream compressor portion 8, and which is directed into the mid-stream compressor portion 9, is indicated schematically by line 24 on compressor map for the mid-stream portion 9. Under such reduced flow conditions, the mid-stream compressor portion 9 is thus also operated at a reduced speed appropriate to retain a suitable surge margin having regard to the surge line 21. This results in a reduction in polytropic head across the midstream compressor portion 9 of approximately 13%, as measured on the y-axis of the compressor map of FIG. 5.

As will be appreciated, the mid-stream compressor portion 9 is thus also operated on a schedule of reducing speed in response to a reduction in plant power (corresponding to a reduction in input flow rate 11 directed into the upstream compressor portion 8, and thus giving rise to a reduced flow rate 12 directed into the midstream compressor portion 9).

It is proposed that the upstream and midstream compressor portions 8, 9 will be designed to operate at maximum power conditions such as to increase the pressure of the carbon dioxide gas to a target of 200 bar, without the need for further compression downstream of the mid-stream portion 9. However, as the power and carbon dioxide output of the plant 1 both reduce such that the upstream and midstream compressor portions 8, 9 are operated at independently reduced speeds as explained above, the overall pressure ratio applied by the two portions in combination will fall, such that the flow of compressed gas 13 exiting the midstream compressor portion 9 will no longer be at the required pressure. It is therefore proposed to operate the downstream compressor portion 10 in such conditions to further pressurize the gas. However, as the upstream and midstream compressor portions 8, 9 will adequately pressurize the gas at higher flow/power conditions, the downstream compressor portion 10 will be operated selectively so that it only contributes to the further compression of the gas when it is required to do so at reduced flow/power.

Figure 6:
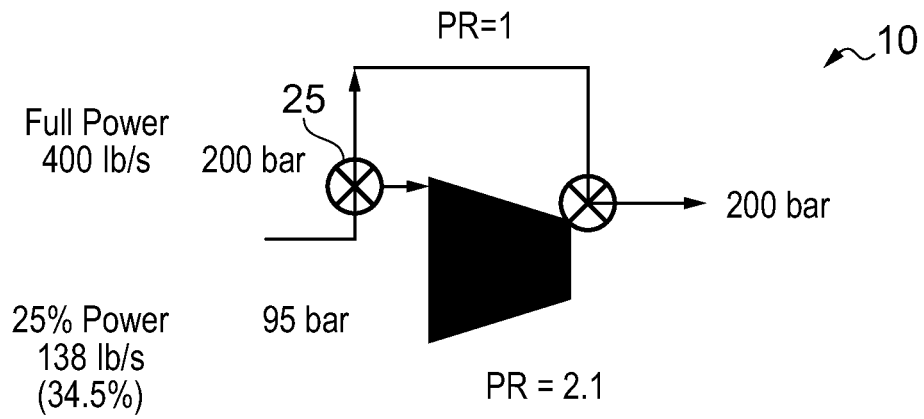
FIG. 6 is a schematic diagram showing the third, downstream, compressor portion of FIG. 2 in more detail.

Turning now to consider FIG. 6, there is illustrated in schematic form a selective operating regime for the downstream compressor portion 10. At full power conditions, the pressure ratio across the upstream and midstream compressor portions 8, 9 in combination is sufficient to produce a compressed flow 13 at the outlet of the midstream portion having a pressure of the requisite 200 bar. Under such conditions, the downstream compressor portion 10 is therefore not required and so will be bypassed, by operation of a bypass valve 25. However, under reduced power conditions, the above-described operating regime for the upstream and midstream compressor portions 8, 9 will only, for example, be sufficient to produce a compressed flow 13 at 95 bar. Under such conditions, the downstream compressor portion 10 is thus required to further pressurize the gas, and so the bypass valve is thus closed in order to direct the partially compressed flow 13 into the downstream portion 10 for further compression to the target pressure of 200 bar.

Figure 7:
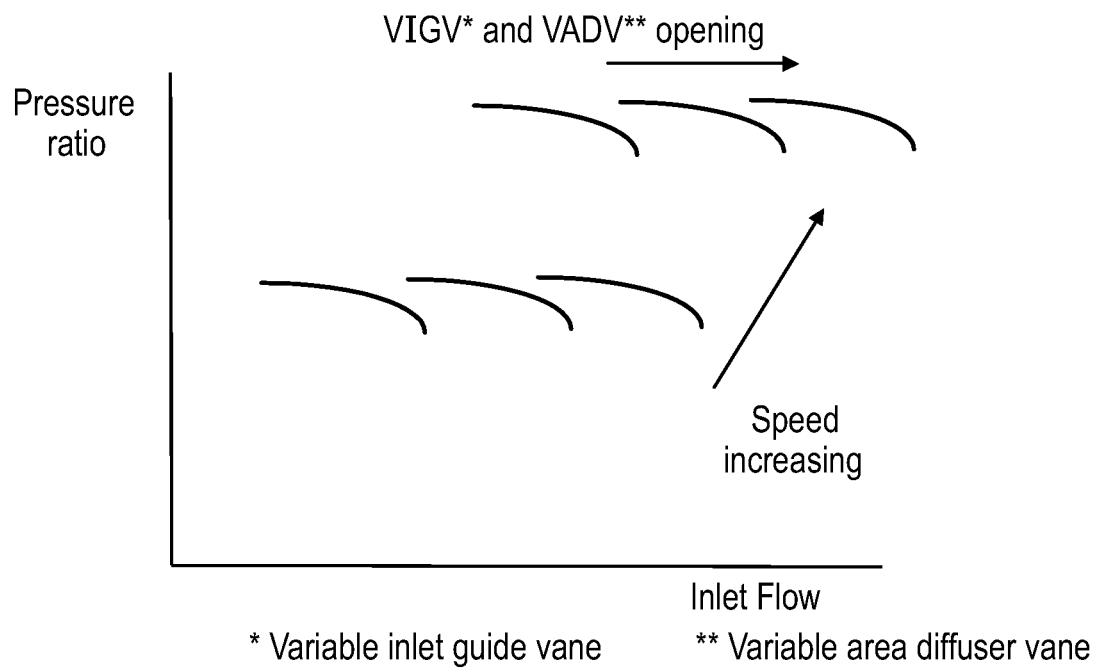
FIG. 7 is a schematic compressor map representing the performance characteristics of a variable-geometry compressor suitable for use in the third compressor portion of the compressor train.

However, it is to be appreciated that selective operation of the downstream compressor portion 10 can be achieved in other ways, rather than requiring the portion to be switched in and out in the manner proposed above. For example, it is envisaged that in variants of the invention, the downstream compressor portion 10 may be configured so as to have a variable geometry and thus may be controlled such that it is selectively reconfigured to the flow conditions. For example, it is proposed that the downstream compressor portion may incorporate one or more compressors having variable inlet guide vanes and/or variable area diffuser vanes. FIG. 7 shows an example of a compressor map for a variable geometry compressor of this general type.

Figure 8:
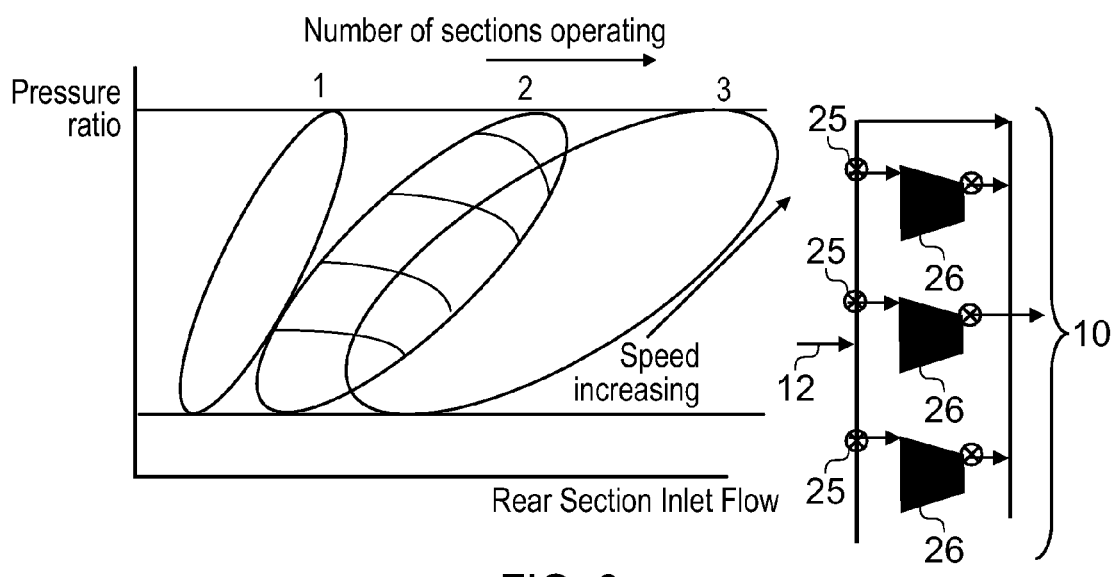
FIG. 8 is a schematic illustration showing a compressor map and parallel compressor arrangement of another embodiment.

Alternatively, the downstream compressor portion 10 may be configured so as to comprise a plurality of compressor sections 26 arranged in parallel relative to one another in the manner illustrated schematically in FIG. 8. As will be noted, each of the compressor sections 26 is associated with a respective bypass valve 25 in a generally similar manner to that proposed above and illustrated in FIG. 6. It is proposed that the downstream compressor portion 10 may be operated in order to provide the requisite pressure ratio by selecting the number of discrete sections 26 through which the compressed flow 13 is directed. As will be appreciated having regard to the illustrative compressor map of FIG. 8, permitting the number of compressor sections 26 to be actively selected in this manner, provides a wide operating range for the downstream compressor portion 10 as a whole.

As will thus be appreciated, the embodiments of the invention described above are operated such that the third compression step within the downstream compressor portion 10 is controlled in dependence on the flow rate of gas directed into the upstream compressor portion 8. This control can be achieved directly in response to changes in the measured flow rate of gas directed into the upstream compressor portion 8. However, this control can alternatively be achieved indirectly, on the basis of a measured pressure value of the gas at the inlet of the upstream compressor portion 8. As will be appreciated, the inlet pressure of the gas is proportional to the flow rate.

As a practical measure, it is proposed that in any embodiments in which a compressor section, such as the upstream or downstream section, is arranged to be bypassed under certain flow conditions, then a recirculating bleed arrangement can be provided. Such a recirculating bleed may serve to prevent surge in the event that a compressor section continues to spin whilst bypassed. A recirculating bleed may selectively communicate fluid from the outlet of any compressor section into the inlet of the bypassed section.

Whilst the invention has been described above with particular reference to its use in the compression of carbon dioxide as part of a CCS scheme, it is to be noted that the invention could also be used for the compression of other gases, and so is not to be interpreted as restricted to its application to carbon dioxide.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of compressing a gas for a gas sequestration process, said method using a compressor train having a plurality of discrete compressor portions and comprising at least an upstream compressor portion, a mid-stream compressor portion and a downstream compressor portion arranged successively in flow series, the method comprising:
   (i) performing a first compression step by directing a flow of said gas into the upstream compressor portion and driving the upstream compressor portion to compress the gas;
   (ii) performing a second compression step by directing the compressed flow from the upstream compressor portion into the mid-stream compressor portion and driving the mid-stream compressor portion to further compress the gas; and
   (iii) performing a third compression step by directing the compressed flow from the mid-stream compressor portion into the downstream compressor portion and driving the downstream compressor portion to further compress the gas, wherein said third compression step is performed selectively in dependence on a flow rate of gas directed into the upstream compressor portion and only when the flow rate of gas directed into the upstream compressor portion is below a predetermined threshold value, and
   wherein driving each of the discrete compressor portions is performed independently of one another.

2. A method according to claim 1, wherein said third compression step is controlled in dependence on the flow rate of gas directed into the upstream compressor portion.

3. A method according to claim 2, wherein the flow rate of gas directed into the upstream compressor portion is determined from a determination of pressure of the gas as measured in a vicinity of or upstream of an inlet of the upstream compressor portion.

4. A method according to claim 1, wherein said third compression step is eliminated when the flow rate of gas directed into the upstream compressor portion exceeds said predetermined threshold value, by directing the compressed flow from the mid-stream compressor portion so as to bypass the downstream compressor portion.

5. A method according to claim 1, wherein said threshold value is approximately 25% of a maximum flow rate.

6. A method according to claim 2, wherein said downstream compressor portion comprises at least one variable-geometry compressor, said third compression step being controlled by adjusting the geometry of the or each said variable-geometry compressor.

7. A method according to claim 2, wherein said downstream compressor portion comprises a plurality of selectively operable compressors arranged in parallel flow-relation to one another, said third compression step being controlled via selection of a number of said parallel compressors for operation and through which compressed gas from the mid-stream compressor portion is directed.

8. A method according to claim 7, wherein said third compression step is controlled by increasing a number of said parallel compressors in operation in response to a decrease in the rate of flow of gas directed into the upstream compressor portion.

9. A method according to claim 1, wherein a speed at which at least the upstream compressor portion is driven is varied in dependence on the flow rate of gas directed into it.

10. A method according to claim 9, wherein the speed of the upstream compressor is reduced in response to a reduction in the flow rate of gas directed into it, the upstream compressor thus producing a reduced outlet flow for direction into the mid-stream compressor portion.

11. A method according to claim 1, wherein a speed at which the mid-stream compressor portion is driven is varied in dependence on a flow rate of compressed gas directed into it.

12. A method according to claim 11, wherein the speed of the mid-stream compressor is reduced in response to a reduction in the flow rate of gas directed into it, the mid-stream compressor thus producing a reduced outlet flow.

13. A method according claim 1, wherein the gas is carbon dioxide and the method forms part of a carbon dioxide sequestration scheme.

14. A method according to claim 13, wherein the carbon dioxide directed into the compressor train is obtained directly from a power generation plant configured to operate at variable power.

15. A compression system for gas sequestration comprising:
   a compressor train having a plurality of discrete portions and comprising at least an upstream portion, a mid-stream portion and a downstream portion arranged successively in flow series such that gas exiting the upstream portion is further compressible by the mid-stream portion and gas exiting the mid-stream portion is further compressible by said downstream portion;
   a drive for imparting motion to said compressor train; and,
   a controller arranged to control driving of one or more of the discrete portions independently of said other portions based on a gas flow rate determination, wherein the compression of the gas in the downstream portion is performed selectively in dependence on the flow rate of gas directed into the upstream portion and only when the flow rate of gas directed into the upstream portion is below a predetermined threshold value.

16. A compression system according to claim 15, wherein the drive comprises a motor dedicated to each of the upstream, mid-stream and down-stream portions and arranged to independently drive said compressor portions.

* * * * *